United States Patent [19]

Björklund

[11] 4,377,780

[45] Mar. 22, 1983

[54] MEANS FOR DAMPING MECHANICAL TORSIONAL OSCILLATIONS OF AN ELECTRIC A.C. GENERATOR

[75] Inventor: Hans Björklund, Ludvika, Sweden

[73] Assignee: ASEA Aktiebolag, Västeras, Sweden

[21] Appl. No.: 153,656

[22] Filed: May 27, 1980

[30] Foreign Application Priority Data

Jun. 6, 1979 [SE] Sweden ................................ 7904913

[51] Int. Cl.³ ................... H02J 3/36; H02H 7/06; H02P 9/00
[52] U.S. Cl. ........................................ 322/29; 322/58; 361/20; 363/35
[58] Field of Search .................. 322/20, 22, 25, 28, 322/32, 89, 7, 8, 100, 29, 58; 361/20; 307/102; 363/35, 87

[56] References Cited

U.S. PATENT DOCUMENTS

| | | | |
|---|---|---|---|
| 3,551,778 | 12/1970 | Ekström | 363/79 |
| 3,614,585 | 10/1971 | Wedin | 363/35 |
| 3,689,823 | 9/1972 | Uhlmann | 363/35 |
| 3,999,115 | 12/1976 | South et al. | 322/29 |
| 4,329,637 | 5/1982 | Kotake et al. | 361/20 X |

Primary Examiner—R. J. Hickey
Attorney, Agent, or Firm—Pollock, Vande Sande & Priddy

[57] ABSTRACT

For damping torsional oscillations of an electric a.c. generator, a speed-sensing member, for example a tachometer-generator, is connected to the a.c. generator. The speed-dependent signal generated by the speed-sensing member is supplied to a band-pass filter which is adapted to the natural frequency of the torsional oscillations. The output signal of the band pass filter is supplied directly to the control angle determining means of a converter connected to the generator. In this way, the power of the converter is modulated in such a way that the oscillations are damped.

7 Claims, 2 Drawing Figures

MEANS FOR DAMPING MECHANICAL TORSIONAL OSCILLATIONS OF AN ELECTRIC A.C. GENERATOR

TECHNICAL FIELD

This invention relates to a means for damping mechanical torsional oscillations of an electric a.c. generator, in which a controllable converter is connected to the generator for transmission of power between the generator and the d.c. side of the converter.

In the operation of electrical machines, torsional oscillations may occur in the rotating parts of the machine, resulting in the shaft of the machine being subjected to torsional stresses. An example of a machine in which high stresses may be caused by torsional oscillations is a turbo-generator driven by a steam turbine. The rotating mass, consisting of the shafts and rotors of the turbine and the generator, is able to perform weakly damped and relatively low-frequency torsional oscillations with a frequency of, for example, some ten to thirty Hz. Such oscillations may occur, for example, upon synchronizing, in the event of a short-circuit or upon connection of the generator to a series-compensated power line. In certain cases, for example when the generator is connected via a converter to a transmission line for high-voltage direct current, it has even proved that the damping of the oscillations may become negative. This particularly applies to machines in which the torsional oscillations have a low natural frequency, and this may make it impossible to connect such a machine to a high-voltage d.c. transmission system.

The present invention aims to provide a means for damping torsional oscillations in an a.c. generator, whereby the mechanical stresses caused by the oscillations may be reduced in amplitude and duration, thus making it possible to connect generators with low natural oscillation frequencies to high voltage d.c. transmission systems.

DISCLOSURE OF INVENTION

According to the invention, for damping mechanical torsional oscillations of an electric a.c. generator, in which an electric converter, having control means for influencing the control angle of the converter, is connected on its a.c. side to the generator for transmitting power between the generator and the d.c. side of the converter, there is provided a damping means which comprises sensing means for forming a signal which corresponds to speed variations of the generator with a frequency corresponding to a natural frequency of torsional oscillations of the generator, and means for supplying said signal to said control means so as to influence directly the control angle of the converter and thereby the active power of the converter for damping the oscillations.

In the means in accordance with the invention, said signal, which corresponds to speed variations of the generator, is arranged to influence directly the control angle of the converter. By "directly" is meant that the signal is not supplied to said control means of the converter via current or power regulators arranged before the control means. The reason is that at the frequencies used in these cases, such regulators introduce damping and/or phase shift of such a magnitude that the desired damping of the torsional oscillations cannot be accomplished.

The aforesaid sensing means may comprise a speed-sensing member, the output signal of which is adapted to be supplied to said control means of the converter via a band pass filter which is adapted to pass signals having a frequency corresponding to a natural frequency for torsional oscillations of the rotating parts of the generator and rotating masses mechanically coupled to said parts. The speed-sensing member may consist of a tachometer-generator mechanically coupled to the generator. Alternatively, the speed-sensing member may consist of a frequency-sensing member connected to the stator voltage of the generator, this frequency-sensing member being adapted to form a signal corrresponding to the frequency of said voltage.

The sensing means may comprise phase-shifting members for positive phase shift of the signal which corresponds to the speed variations of the generator.

The control means of the converter may comprise control pulse-delivering members adapted to deliver each control pulse when a certain time interval with a controllable length has passed since the delivery of the immediately preceding control pulse, the signal from the sensing means being adapted to be supplied to the control pulse-delivering members to influence the length of said time interval.

BRIEF DESCRIPTION OF DRAWINGS

The invention will now be described, by way of example, with reference to the accompanying drawings, in which

FIG. 1 shows a machine unit which includes a three-phase a.c. generator G connected to a steam turbine TU having high-pressure, intermediate-pressure and low-pressure stages HP, MP and LP, respectively. The shafts of the generator and the turbine are interconnected by a common shaft SH. The generator G is connected to a three-phase network N via a transformer T1. An electric converter SR is connected to the network N via a transformer T2. The converter SR transmits power between the network N and a d.c. network L. This may, for example, consist of a transmission line for high-voltage direct current. The converter SR comprises a converter bridge having six thyristor valves TR1–TR6, and the converter has a control system of the kind described in U.S. Pat. No. 3,551,778.

Figure 1:
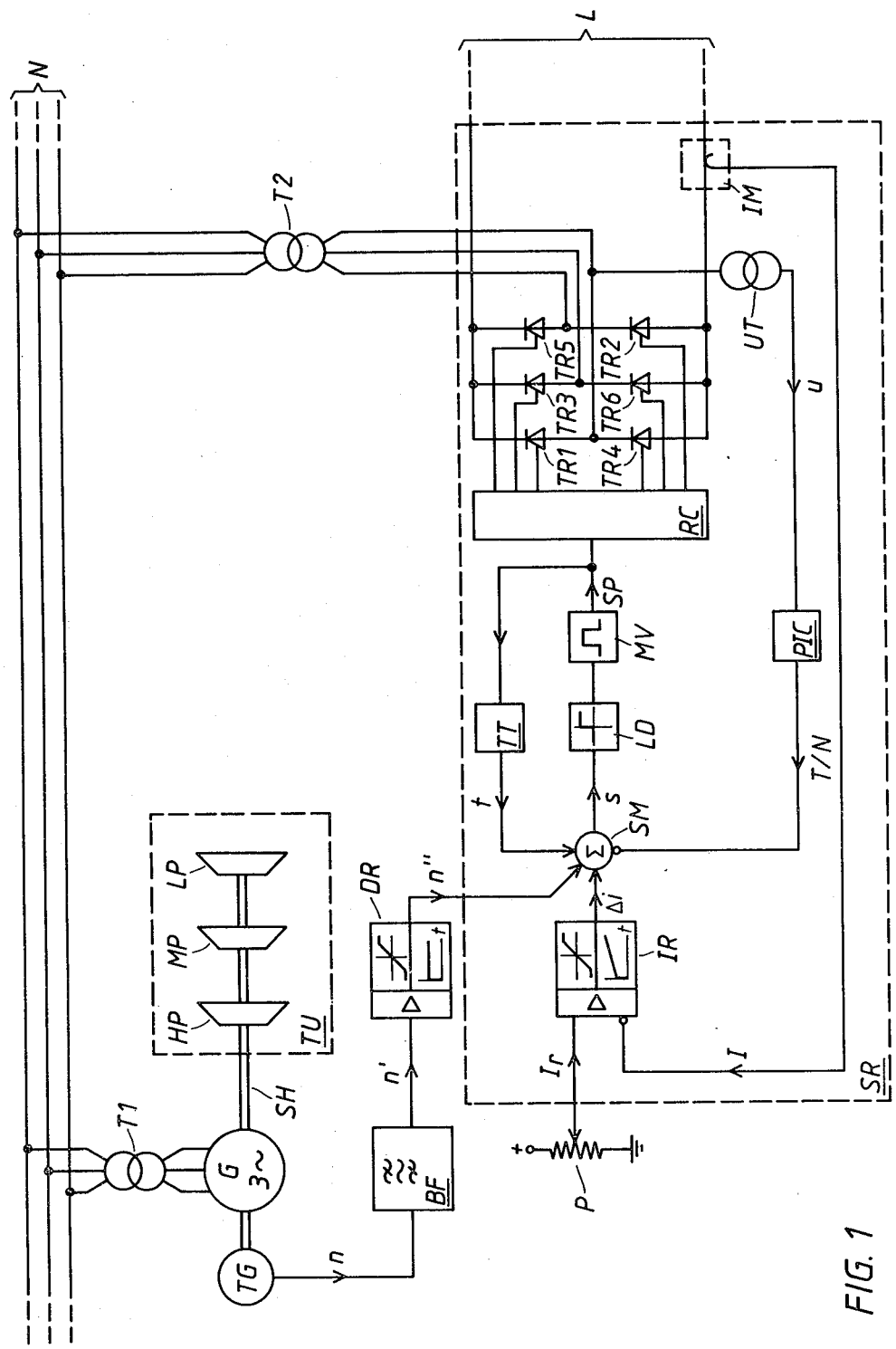
FIG. 1 is a circuit diagram of damping means in accordance with the invention for a turbo-generator.

A ring counters RC delivers control pulses in the correct sequence and with a suitable length to the valves of the bridge. Each time that the ring counter RC receives a pulse SP from a flip-flop MV, it steps one step forward, a control pulse then being supplied to a new valve. The flip-flop MV is triggered via a level detector LD each time that the output signal s from a summation circuit SM becomes positive. A voltage transformer UT senses the alternating voltage u of the converter, which voltage is supplied to a circuit PIC which, with the guidance of the distance between the zero passages of the alternating voltage, calculates a quantity T/N which corresponds to the period T of the alternating voltage divided by the pulse number N of the converter (in the case shown N=6). The quantity T/N is supplied to an inverting input of the summation circuit SM. A time-measuring member TT, for example an integrator with a constant input voltage, is set to zero upon each control pulse. The output signal t from the member TT thus corresponds to the time that has passed since the immediately preceding control pulse and is supplied to the summation circuit SM. Each time that $t=T/N$, the output signal s of the summation circuit switches from a negative value to a positive value and a control pulse is delivered to the converter.

For control of the control angle of the converter, i.e. the phase position of the control pulses relative to the alternating voltage, there is arranged a current regulator IR. From a potentiometer P the regulator IR is supplied with a reference value $I_r$ for the direct current of the converter. A current measurement device IM, for example a measuring transductor, delivers a signal I, which corresponds to the direct current of the converter and which is supplied to the regulator IR with reversed sign. The output signal $\Delta i$ of the regulator IR is a function of the regulating error $I-I_r$. The signal $\Delta i$ is supplied to the summation circuit SM and influences the frequency of the control pulses and thus their phase position and the control angle of the converter in such a way that the current is controlled into agreement with the reference value $I_r$.

A tachometer-generator TG is mechanically coupled to the generator G and delivers a direct voltage signal n which, at each moment, is proportional to the speed of rotation of the generator. The signal n is supplied to a band pass filter BF. This is arranged to pass signals with a frequency corresponding to a natural oscillation frequency of torsional oscillations of the machine unit, i.e. of the shaft SH and the rotating masses of the turbine and generator mounted on said shaft. The filter may have a relatively broad pass band, for example a pass band of from 10 to 40 Hz., and may then pass natural frequencies of several different torsional oscillation modes. On the other hand, frequencies within ranges other than that in which the intended torsional oscillations occur are damped.

The output signal n' of the band pass filter BF is supplied to a circuit DR for amplitude limitation and matching of the signal. The output signal n" from the circuit DR, which signal corresponds to the variations of the generator speed caused by torsional oscillations, is supplied to the summation circuit SM. A positive value of the signal n" means that the speed of the generator G is higher than the average value and results in an increase of the frequency of the control pulses and thus in the control pulses being delivered at an earlier stage, i.e. a reduction of the control angle of the converter. This, in turn, causes an increase of the direct voltage and the current of the converter, and therefore an increase of the active power supplied by the converter to the d.c. network L. This power increase involves an increase of the retarding torque on the generator. In a corresponding manner, a negative value of the signal n" involves a reduction of the power of the converter and of the retarding torque on the generator.

With the means described, torsional oscillations in the machine unit will thus cause the current and power of the converter to be modulated in such a way that the oscillations are counteracted. This results in an efficient damping of the torsional oscillations that occur. This means that the mechanical stresses on the machine unit (and especially on the shaft SH) will be considerably reduced, and it will also be possible to connect machine units having low natural oscillation frequencies to converters, for example for power transmission with high-voltage direct current.

The amplitude of the power modulation which is performed by the damping means in accordance with the invention may be low compared with the power normally transmitted by the converter, and the normal function of the converter will not be disturbed by the power modulation introduced by the damping means.

If the converter SR is part of one of the converter stations of a d.c. transmission system, there will be a corresponding converter at the other end of the transmission system. The power modulation may then alternatively be carried out in the latter converter.

The most efficient damping is achieved if the converter power is not small compared with the power of the a.c. generator, and the invention provides the greatest advantages in those cases where the converter power is of the same order of magnitude as the generator power.

For damping torsional oscillations of a machine unit having several different natural frequencies, or of several generators with different natural frequencies, connected to the converter, several band pass filters BF, each suitably having a separate matching circuit DR, may be arranged to influence the control angle of the converter in the manner shown in FIG. 1. Each band pass filter is then arranged to pass a natural frequency of the generator whose speed variations it is sensing.

In the embodiment of FIG. 1, the speed-dependent signal n is obtained from a tachometer-generator connected to the generator G. a signal which is a measure of the instantaneous speed of rotation of the generator may, however, be obtained with the aid of other, known speed-measuring devices, for example a toothed or grooved wheel with magnetic or optical sensing and conversion of the obtained pulse frequency to a direct voltage corresponding thereto. The speed measuring device used may be connected to the generator in different ways. It should, however, be mechanically closely connected to the generator so as to follow the speed variations of the generator closely.

Another way of obtaining a signal which corresponds to the speed variations of the generator within the frequency range in question is by providing the generator shaft with a torsion transducer which delivers a signal corresponding to the torsional moment of the shaft. This signal is supplied to the control angle determining means of the converter for influencing the control angle, possibly by way of phase-shifting members for obtaining a correct phase position of the power modulation.

Figure 2:
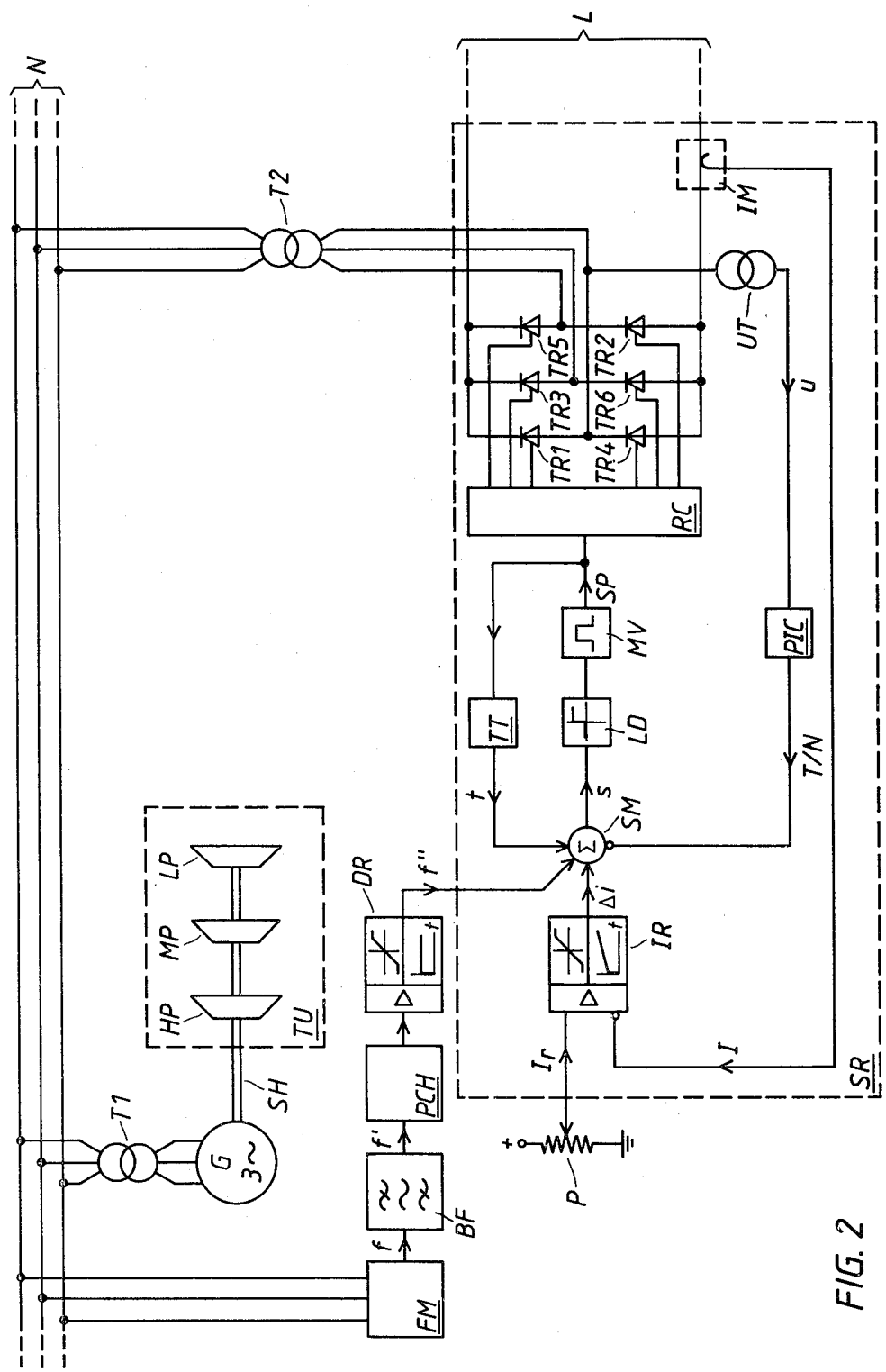
FIG. 2 is a circuit diagram of an alternative embodiment of the means shown in FIG. 1, in which the sensing of speed variations in the generator is carried out by measuring the frequency of the stator voltage of the generator.

A third way of obtaining a signal corresponding to the speed variations is shown in FIG. 2. The embodiment of the damping means shown in FIG. 2 is identical with that shown in FIG. 1, with the exception that the speed measurement has been replaced by measurement of the frequency of the generator G. This method may be used when the generator alone, or substantially alone, determines the frequency of the network N, the frequency of which will then constitute a measure of the instantaneous speed of the generator. A frequency measuring member FM is connected to the network N and delivers a signal f which is a measure of the instantaneous value of the frequency. The frequency measurement may be performed in any manner known per se, for example by measuring the length of the half-periods of the alternating voltage. The signal f is filtered in a band pass filter BF adapted to the natural frequency of the torsional oscillations in question. The output signal F' of the filter is a measure of the speed variations associated with the oscillations. Since the frequency measurement results in a certain delay, the signal f' is supplied to the matching network DR via a phase-shifting device PCH, which gives a positive phase shift of such a magnitude that the negative phase shift in the frequency-measuring circuit FM (and other possible phase shifts as well) is compensated.

The band pass filter BF in FIG. 2 should have a narrower band than in the embodiment of FIG. 1, since the frequency measurement may cause irrelevant oscillations of the measuring signal f. The Q-value of the filter may, for example, be 10.

If damping of several oscillations with different natural frequencies (in the same generator or in separate generators connected to the converter) is desired, the measuring signal f may be supplied to several band pass filters adapted to the frequencies in question, the output signals of the band pass filters being supplied to the summation circuit Sm via phase-shifting and matching circuits to influence the control angle of the converter.

The invention is not, of course, limited to the embodiments described above with reference to the drawings. Thus, the illustrated control means for the converter is only one example, and the invention may be employed in a corresponding manner with other types of control devices as well. The three-phase network N need not be a network in the real sense of the word. Thus the generator G may be connected only to the converter SR, and in that case the network N consists only of the current bars which connect the generator to the converter.

What is claimed is:

1. A high voltage direct current power transmission apparatus comprising a static convertor having d.c. terminals for connection to a d.c. network and a.c. terminals for connection to an a.c. network, said a.c. network comprising an electric a.c. generator, said convertor being arranged for transmitting power between said a.c. and d.c. networks, said convertor having current regulator means for controlling the convertor current in accordance with a reference signal supplied to said current regulator means, control means for influencing the control angle of the convertor and having an input connected to an output of said current regulator means, sensing means for forming a signal which corresponds to speed variations of the generator with a frequency corresponding to a natural frequency of torsional oscillations of the generator, and means for supplying said signal to said control means so as to influence directly the control angle of the convertor and thereby the active power of the convertor for damping the oscillations.

2. Apparatus according to claim 1, wherein said sensing means comprises a speed-sensing member, the output signal of which is adapted to be supplied to said control means of the converter via a band pass filter which is adapted to pass signals having a frequency corresponding to a natural frequency for torsional oscillations of the rotating parts of the generator and rotating masses mechanically coupled to said parts.

3. Apparatus according to claim 2, wherein said speed-sensing member consists of a tachometer-generator mechanically coupled to said generator.

4. Apparatus according to claim 2, wherein said speed-sensing member consists of a frequency-sensing member connected to the stator voltage of said generator, said frequency-sensing member being adapted to form a signal corresponding to the frequency of said voltage.

5. Apparatus according to claim 1 or claim 2, wherein said sensing means comprises phase-shifting members for positive phase shift of the signal which corresponds to the speed variations of said generator.

6. Apparatus according to claim 1 or claim 2, wherein said control means of the converter comprises control pulse-delivering members adapted to deliver each control pulse when a certain time interval with a controllable length has passed since the delivery of the immediately preceding control pulse, said signal from the sensing mans being adapted to be supplied to said control pulse-delivering members to influence the length of said time interval.

7. A high voltage direct current power transmission apparatus comprising a static convertor having d.c. terminals for connection to a d.c. network and a.c. terminals for connection to an a.c. network, said a.c. network comprising an electric a.c. generator, said converter being arranged for transmitting power between said a.c. and d.c. networks, said converter having current regulator means for controlling the convertor current in accordance with a reference signal supplied to said current regulator means, control means for influencing the control angle of the convertor and having a first input connected to an output of said current regulator means, sensing means for forming a signal which corresponds to speed variations of the generator with a frequency corresponding to a natural frequency of torsional oscillations of the generator, and means for supplying said signal to a second input of said control means so as to influence directly the control angle of the converter and thereby the active power of the convertor for damping the oscillations.

* * * * *